Patented Apr. 15, 1930

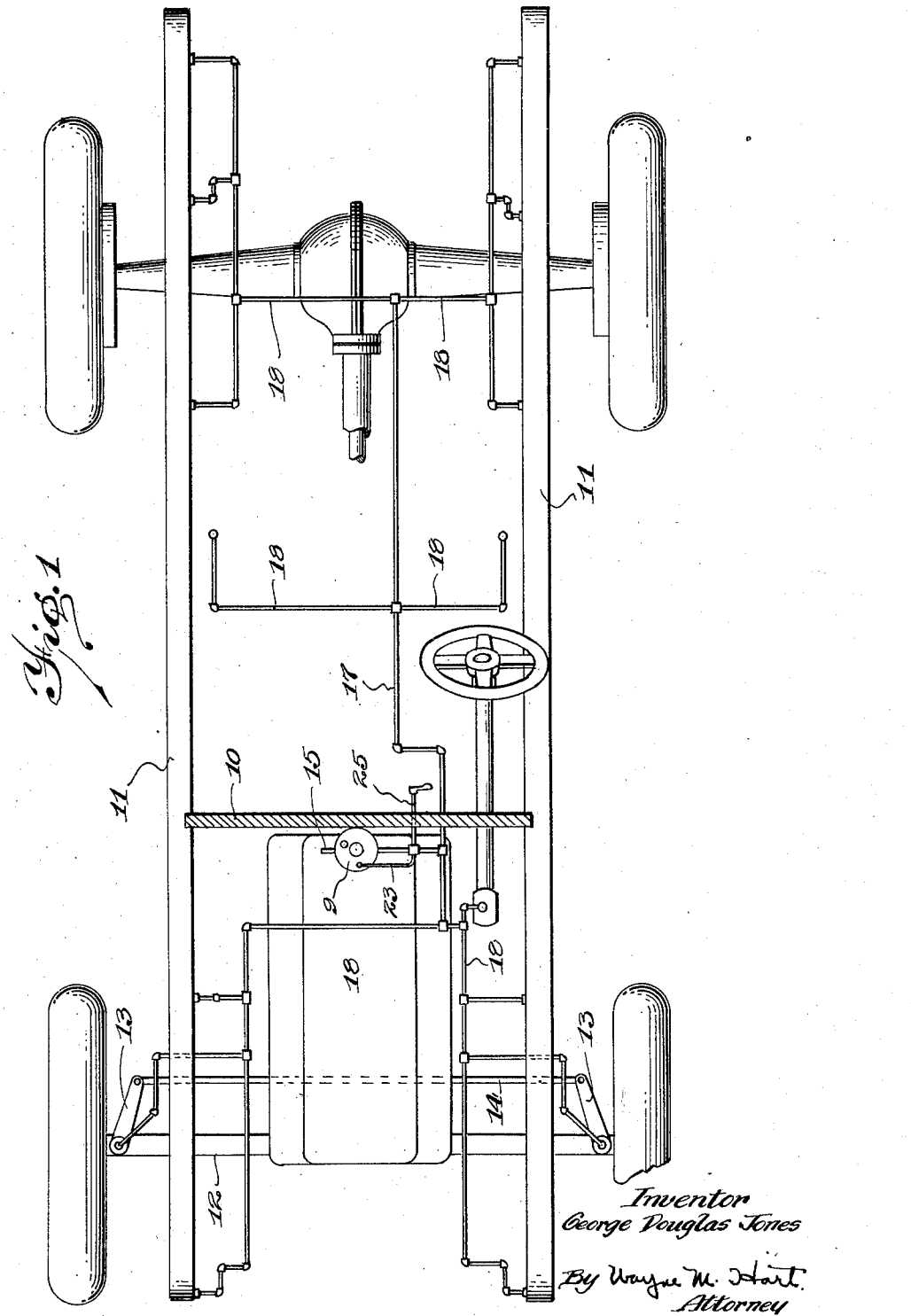

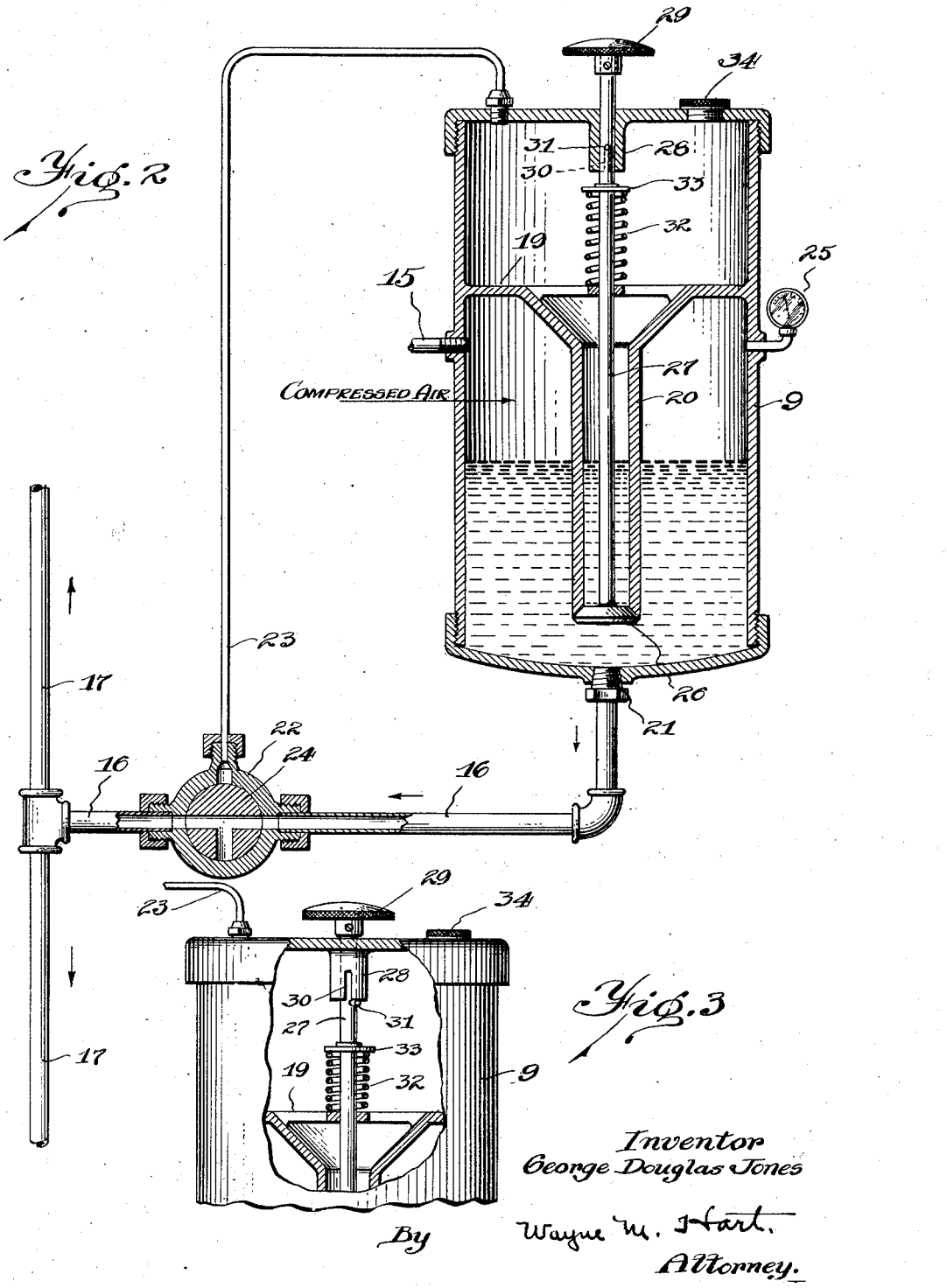

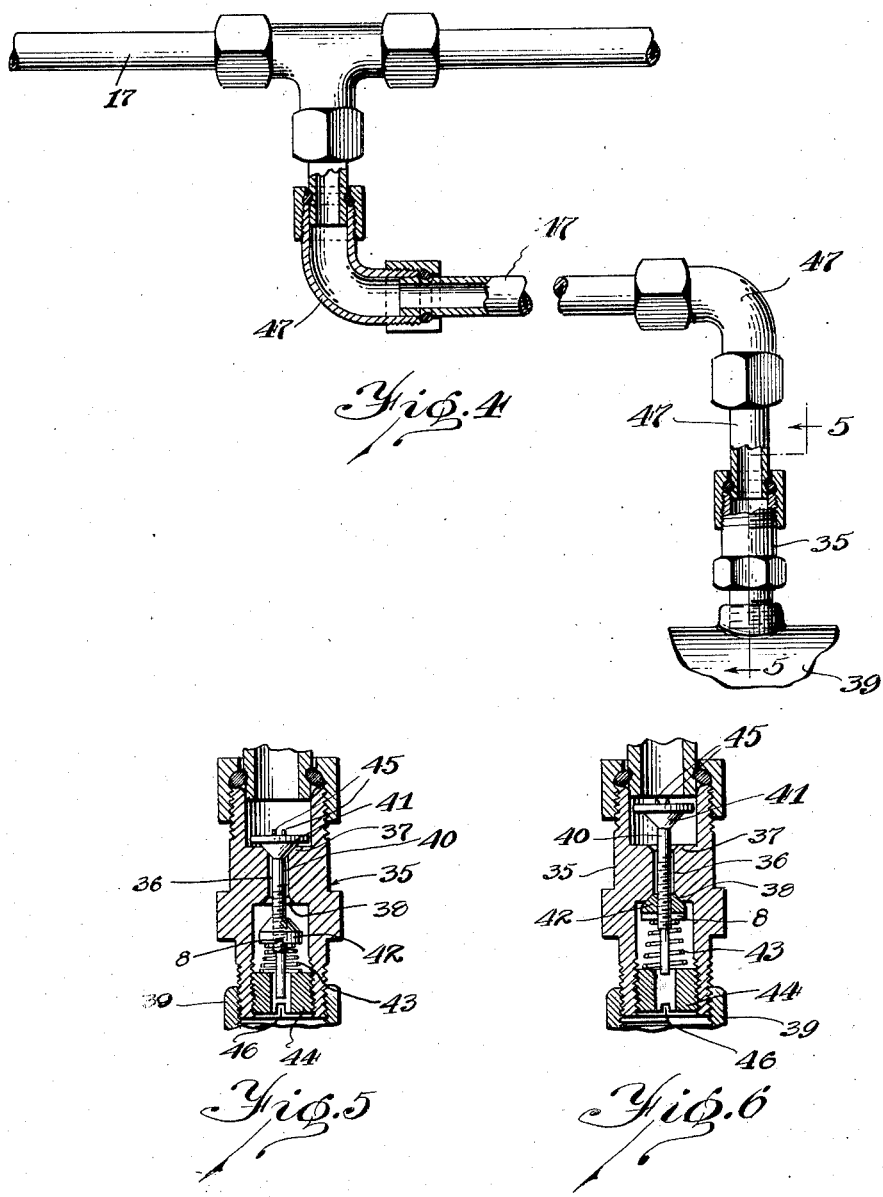

1,754,859

UNITED STATES PATENT OFFICE

GEORGE DOUGLAS JONES, OF SACRAMENTO, CALIFORNIA, ASSIGNOR TO CHARLES MOREING, OF SACRAMENTO, CALIFORNIA

LUBRICATING SYSTEM

Application filed November 29, 1926. Serial No. 151,337.

This invention relates to lubricating systems for machinery, and more particularly to systems in which lubricant is dispensed to a plurality of bearings from a common source of supply.

Lubricating systems of the above character usually include conduits which are provided with check valves, or with metering chambers in which a definite quantity of lubricant is trapped prior to each dispensing operation. With the check valves, the lubricant is free to flow during the entire application of pressure in the system and the lubricant cannot be controlled with any degree of accuracy, thus causing either under or over lubrication.

The systems employing metering chambers are usually of the gravity or force injection type. The gravity type provides no means for forcing lubricant through a tight or clogged bearing. With both of these types the quantity of lubricant delivered on each injection operation is defined by the area of the chambers which necessitates a graduated assortment to vary the quantity, and this condition is costly both in manufacturing and in servicing.

An object of this invention is to overcome the above disadvantages by providing a pressure operated lubricating system in which valve mechanisms can be adjusted to permit predetermined quantities of lubricant to be delivered to the individual bearings as desired.

Another object of my invention is to provide a pressure operated lubricant distributing system for a plurality of bearings with which a lubricant reservoir is utilized to dispense lubricant under pressure and to receive excess pressure from the system when pressure is relieved.

These and other objects will be more apparent as the description progresses.

In the drawings:

Fig. 1 is a plan view of an automobile chassis having a lubricating system incorporating my invention associated therewith.

Fig. 2 is a fragmentary elevation of the lubricating system showing the reservoir and pressure control valve in section.

Fig. 3 is a fragmentary elevation of the reservoir partially in section to illustrate the position of the valve stem when the chambers are communicating.

Fig. 4 is a fragmentary elevation partially in section showing a branch conduit attached to a bearing with a metering valve therein.

Fig. 5 is a vertical sectional view of a portion of a conduit and the metering valve therein in one of its closed positions, taken on line 5—5 of Fig. 4.

Fig. 6 is a similar view showing the metering valve in its other closed position.

I have illustrated my invention associated with the bearings of an automobile chassis of conventional construction which includes a dash 10, channels 11, a front axle 12 and the steering knuckles 13 connected by the radius rod 14. The bearings to which the lubricant distributing conduits lead are shown as associated with the steering knuckles, spring shackles and the brake rod connections, but obviously all other bearings and parts can be lubricated from a central source of lubricant supply by the addition of branch conduits leading thereto.

A lubricant reservoir 9 is secured to the dash 10, or to some other part of the automobile, preferably in a plane above all of the bearings to be lubricated, and a conduit 15 is provided to establish communication between the reservoir and a suitable air compressor so that pressure can be applied on the lubricant in the reservoir.

A conduit structure extends intermediate the lubricant reservoir and the bearings, and includes a feed conduit 16, a main distributing conduit 17 and a plurality of branch conduits 18 which lead to one or more bearings. The conduits are preferably all formed of rigid pipe sections which can be attached to the chassis and connected by relatively movable joints to compensate for movement of some of the bearings.

The reservoir 9 is divided into two chambers by a partition 19, from the central portion of which depends an open cylindrical neck 20. The lower chamber is the main lubricant container, and the air pressure is admitted thereto to force the lubricant through the distributing conduit structure. The feed conduit is secured in open communication with the main reservoir chamber by a connection 21, and a valve housing 22 is associated in the feed conduit. The valve housing is formed with opposed openings into which sections of the feed line extend, and with an upper opening into which a relief conduit 23 extends. The relief conduit 23 leads into the upper reservoir chamber, and a two-way valve 24 within the valve housing can be turned to establish communication between the pipe sections forming the feed conduit, cutting off the relief line, or to cut off the lubricant in the feed line and establish communication between the feed line beyond the valve and the relief conduit.

The valve 24 can be rotated by hand operated mechanism 25 which extends through the dash within easy grasp of the driver. The pressure is preferably continuously maintained upon the lubricant in the reservoir, and the lubricant is injected under pressure through the conduit structure to the bearings by regulating the valve 24 to open the feed conduit. When the pressure dispensing operation is completed, the valve 24 is moved to shut off the passage of lubricant and connect the relief conduit with the conduit means, thus relieving the pressure in the system for reasons hereinafter explained. A gauge 25 is connected with the lubricant reservoir so that the pressure can be readily discerned in order that it can be maintained. A valve 26 normally closes the lower end of the neck 20, being secured to a stem 27 which extends through the neck 20 and a guide 28 to the exterior of the reservoir, and has a knob 29 secured on the end thereof. The guide 28 has a vertical slot 30 therein in which a pin 31 secured to the valve stem 27 is reciprocated. A coil spring 32 is secured between a retainer 33 secured to the valve stem and the baffle 19 to normally maintain the stem in its outermost position and thus close the valve 26. By removing the screw cap 34 lubricant can be supplied to the reservoir chamber when the valve rod is depressed to open the valve. By unseating the valve any lubricant which has flowed therein during the relief periods can also be returned from the upper reservoir chamber to the lubricant supply chamber. By revolving the valve stem when the pin 31 has been pressed below the lower end of the guide 28, the valve can be maintained in open position.

Located within each branch conduit leading to each bearing I provide an automatic metering device which will positively and accurately permit a variable predetermined quantity of lubricant to be injected into the bearing under pressure during each feeding operation of the system, and which will also shut off the passage during the inoperative periods of the system. The metering device in each branch conduit includes a valve mechanism which co-operates with seats interiorly of a conduit section 35 which is preferably attached to the bearing. A portion 36 of the passage in the valve conduit section 35 is reduced in sectional area, thus providing an inlet seat 37 and an outlet seat 38. One end of the valved conduit section is secured to the branch conduit, and the other end thereof is screwed into an opening leading to the bearing 39. A valve stem 40 is assembled to extend through the passage 36, and a pair of valves 41 and 42 are secured to the stem exteriorly of the reduced passage, being arranged to seat against the seats 37 and 38 respectively when at the extreme reciprocable positions. The outlet valve 42 is screwed upon a threaded end of the valve stem, and by adjusting the valve the reciprocable movement of the valves and stem can be regulated. One end of a coil spring 43 bears against the outer end of the valve 42 and the other end of the spring seats against an adjustable bearing member 44 which screws into the internally threaded end of the conduit section 35 which screws into the bearing. The inlet valve 41 is provided with spaced projections 45, so that a screwdriver, or similar tool, can be utilized to screw the stem in the head 42 to regulate the space between the valves while assembled within the conduit section, and the valve 42 is provided with a slot 8 so that a tool can be inserted into the conduit section to hold the valve 42 stationary while adjusting the valve 41. The bearing 44 is notched at 46 for the purpose of removing it and for adjusting the tension of the spring 43 against the valve 42. The valve and stem are preferably constructed as an integral structure; however, the device could be constructed so that the valves operate independently and with another form of spacing adjustment.

The branch conduits are preferably constructed of a plurality of rigid pipe sections 47 in addition to the section 35, the sections being formed angular when necessary to reach bearings which are out of direct alignment. The sections are secured at their adjacent ends in leakproof relation and in a manner to permit relative rotation, and by suitable arrangements of the sections and connections a universal movement results allowing movement of certain bearings relative to the chassis to which the distributing conduit is secured.

When the lubricant in the reservoir 9 is placed and maintained under desired pressure, the valve 24 is operated to permit passage of the lubricant under pressure through the feed conduit, distributing conduit and the branch conduits which are in open communication. The metering valve structure is normally in the position shown in Fig. 6 when the valve 24 is closed to relieve the pressure, and when the valve 24 is moved to dispensing position, as in Fig. 2, lubricant under pressure passes through the conduit section 35 to the bearing until the pressure on the lubricant forces the valve 41 against the seat 37, as shown in Fig. 5. When the valve 24 is moved to close the feed conduit and open the relief conduit to the distributing conduit, pressure in the conduit system is relieved, whereupon the spring 43 moves the valve 42 against the seat 38 and opens the valve 41. When pressure on the lubricant, preferably oil, is relieved it will flow past the valve 41 by gravity and fill the space in the conduit between the valves 41 and 42. When the pressure operation is effected valve 42 opens, the lubricant between the valves is forced to the bearing, and also the amount of lubricant which is forced by the valve 41 while closing. The action of the valve is automatic, as pressure on the lubricant closes the valve 41 and opens the valve 42, while the spring closes valve 42 and opens valve 41 when pressure is relieved.

The quantity of lubricant delivered to a valve during each pressure operation is positively controlled, as the pressure closes the valve 41 cutting off the supply until the pressure is relieved. The amount of lubricant delivered can be varied by regulating the timing of the closing movement of the valve 41. The timing can be regulated by adjusting the position of the bearing member 44 to change the tension of the spring against the valve structure and thus increase or decrease the resistance of the valves to the pressure on the lubricant, or by adjusting the position of the valve 42 on the stem the reciprocal stroke of the valve structure can be varied, that is, the distance the valve 41 must be moved from extreme open to closed position while pressure is applied in the conduit system. With the valve structure described pressure is utilized to inject the lubricant to the bearing and to close the valve, and only a variable predetermined quantity is delivered to the bearings on each application of pressure in the conduit system. If desired both forms of timing regulation just described can be utilized to vary the quantity of oil delivered to a bearing.

The quantity of lubricant delivered to each bearing can thus be varied and positively regulated, insuring the injection under pressure of just the amount of lubricant desired. The adjustable features of the valve mechanisms permit the amount of lubricant delivered to be regulated without replacement of conduit sections, thus promoting economy in manufacture and service.

Various changes can be made in the structure of the system illustrated and described without departing from the spirit of the invention and the scope of what I claim.

What I claim is:

1. An oiling system for machine bearings, comprising a lubricant reservoir, a conduit leading from said reservoir to a bearing, means for intermittently applying and relieving pressure on the lubricant in said conduit, a spring seated valve in said conduit for closing the passage in said conduit when pressure on the lubricant is relieved, another valve in said conduit nearest said reservoir seated by lubricant pressure and normally maintained in open position when pressure on the lubricant is relieved said pressure seated valve closing the passage only when seated, and means for positively spacing said valves, the reciprocal movement of said valves being adjustable to define the quantity of lubricant, delivered to the bearing during each pressure operation.

2. An oiling system for machine bearings, comprising a lubricant reservoir, a conduit leading from said reservoir to a bearing, means for intermittently applying and relieving pressure on the lubricant in said conduit, a spring seated valve in said conduit for closing the passage therein when pressure on the lubricant is relieved, another valve in said conduit nearer said reservoir seated by lubricant pressure and automatically maintained in open position when pressure on the lubricant is relieved, said pressure seated valve closing the passage only when seated, and means for positively spacing said valves the distance said valves move in reciprocating while pressure is applied regulating the quantity of lubricant delivered to the bearing during each operation.

3. An oiling system for machine bearings, comprising a lubricant reservoir, a conduit leading from said reservoir to a bearing, means for intermittently applying and relieving pressure on the lubricant in said conduit, a spring seated valve in said conduit for closing the passage therein when pressure on the lubricant is relieved, and another valve in said conduit nearer said reservoir seated by lubricant pressure and automatically maintained in open position when pressure on the lubricant is relieved, said pressure seated valve closing the passage only when seated, said valves being associated to move in unison, the quantity of lubricant delivered to the bearing during each pressure operation being regulated by the distance said valves travel while reciprocating.

4. An oiling system for machine bearings, comprising a lubricant reservoir, a conduit leading from said reservoir to a bearing, said conduit having a pair of spaced valve seats therein, means for intermittently applying and relieving pressure on the lubricant in said conduit, a unitary reciprocable valve structure in said conduit including a stem and valves, said valves seating alternately at extreme reciprocable movements of said valve structure, and adjustable tension means opposing the pressure in said conduit for timing the open period of said valves when pressure is applied on the lubricant in the conduit to regulate the quantity of lubricant delivered to the bearing during each pressure application said valves stopping passage of lubricant thereby only when seated.

5. An oiling system for machine bearings, comprising a lubricant reservoir, a conduit leading from said reservoir to a bearing, said conduit having a pair of spaced valve seats therein, means for intermittently applying and relieving pressure on the lubricant in said conduit, a unitary reciprocable valve structure in said conduit including a stem and valves, said valves seating alternately at the extreme reciprocable movements of said valve structure, and tension means for said valve structure opposing the pressure on the lubricant, one of said valves being adjustable on said stem to vary the reciprocable movement of said valve structure for regulating the open position of said valves while pressure is applied to the lubricant in the conduit.

6. In a lubricating system for machine bearings, a lubricant reservoir, a conduit leading from said reservoir to a bearing, said conduit having spaced valve seats therein, means for intermittently applying and relieving pressure on the lubricant in said system, valve members in said conduit co-operating with said seats, said valve members closing said conduit only when seated and being spaced relatively a greater distance than said seats, means in said conduit for causing simultaneous movement of said valve members when pressure is applied and relieved, and means in said conduit exerting a predetermined pressure against said valve members in a direction opposed to the movement of the lubricant.

7. In a lubricating system for machine bearings, a lubricant reservoir, a conduit leading from said reservoir to a bearing, a portion of the passage through said conduit being restricted, valve members in the passage in said conduit adapted to be associated with the ends of said restricted passage portion of said conduit to stop the passage of lubricant thereby, said valve members being of smaller section than the conduit passage, means for positively spacing said valve members a greater distance relatively than the length of the restricted passage portion in said conduit, means for intermittently applying and relieving pressure on the lubricant in said conduit, and resilient means opposing the pressure exerted against the lubricant in said conduit.

8. In a lubricating system for machine bearings, a lubricant reservoir, a conduit leading from said reservoir to a bearing, a portion of the passage through said conduit being restricted, valve members in the passage in said conduit adapted to be associated with the ends of said restricted passage portion of said conduit to stop the passage of lubricant thereby, said valve members being of smaller section than the conduit passage, rigid means extending through the restricted passage in said conduit for positively spacing said valve members a greater distance relatively than the length of the restricted passage portion in said conduit, means for intermittently applying and relieving pressure on the lubricant in said conduit, and resilient means opposing the pressure exerted against the lubricant in said conduit.

9. In a lubricating system for machine bearings, a lubricant reservoir, a conduit leading from said reservoir to a bearing, a portion of the passage through said conduit being restricted, valve members in the passage in said conduit associated with the ends of said restricted passage portion of said conduit, said valve members being of smaller section than the conduit passage, means for positively spacing said valve members a greater distance relatively than the length of the restricted passage portion in said conduit, said spacing means being adjustable to vary the distance between said valves, means for intermittently applying and relieving pressure on the lubricant in said conduit, and resilient means associated with said valve members opposing the pressure exerted against the lubricant in said conduit.

10. In a lubricating system for machine bearings, a lubricant reservoir, a conduit leading from said reservoir to a bearing, a portion of the passage through said conduit being restricted, valve members in the passage in said conduit adapted to be associated with the ends of said restricted passage portion in said conduit to stop the passage of lubricant thereby, said valve members being of smaller section than the conduit passage, rigid means extending through the restricted passage in said conduit for positively spacing said valve members a greater distance relatively than the length of the restricted passage portion in said conduit, said valves and rigid means being formed to permit lubricant to flow thereby in said conduit when said valves are unseated, means for intermittently applying and relieving pressure on the lubricant in said conduit, and means associated with said valve members opposing the pressure exerted against the lubricant in said conduit.

11. In a lubricating system for machine bearings, a conduit leading to a bearing from a source of lubricant supply, spaced valve seats in said conduit, reciprocable valves in said conduit cooperating with said seats to control the quantity of lubricant passaging therethrough to said bearing during each feeding operation, means for positively spacing said valves a greater distance than that between said seats, said spacing means causing said valves to move in unison during at least a portion of their travel in both directions, said valves being adapted to permit the flow of lubricant through said conduit and said valve seats to said bearing when unseated and to stop the lubricant flow thereby when seated, means for automatically seating the valve nearest said bearing when less than a predetermined pressure is exerted upon the lubricant in said conduit, and means for intermittently applying and relieving pressure on the lubricant in said conduit.

12. In a lubricating system for machine bearings, a conduit leading to a bearing from a source of lubricant supply, spaced valve seats in said conduit, reciprocable valves in said conduit cooperating with said seats to control the quantity of lubricant passaging therethrough to said bearing during each feeding operation, means for positively spacing said valves a variable distance apart greater than that between said seats, said spacing means causing said valves to move in unison during at least a portion of their travel in both directions, means for permitting flow of lubricant through said conduit and said valve seats to said bearing when said valves are unseated, means for exerting a predetermined pressure against the valve seat nearest said bearing, and means for intermittently applying and relieving pressure on the lubricant in said conduit, the travel of said valves in unison relative to said seats positively controlling the quantity of lubricant received by the bearing upon each operation of said means for applying and relieving pressure.

13. In a lubricating system for machine bearings, a conduit leading to a bearing from a source of lubricant supply, spaced valve seats in said conduit, reciprocable valves in said conduit cooperating with said seats to control the quantity of lubricant passaging therethrough to said bearing during each feeding operation, means for positively spacing said valves a greater distance than that between said seats, said spacing means causing said valves to move in unison during at least a portion of their travel in both directions, means for permitting flow of lubricant through said conduit and said valve seats to said bearing when said valves are unseated, said valves stopping flow thereby when seated, adjustable spring tension means for exerting a predetermined pressure against the valve seat nearest said bearing, and means for intermittently applying and relieving pressure on the lubricant in said conduit.

14. In a lubricating system, a source of lubricant supply, a member to be lubricated, a conduit connecting said source of lubricant supply with a bearing, means for intermittently applying and relieving pressure on the lubricant in said conduit, a coupling element in said conduit having spaced seats therein, and reciprocable valve means in said coupling permitting a predetermined amount of lubricant to pass through said coupling while unseated by each operation of the pressure applying and relieving means, said valves stopping lubricant flow thereby when seated, and means for adjusting the reciprocal movement of said valves to vary the amount of lubricant permitted to pass through said coupling during each application of pressure.

15. In a lubricating system in which pressure is intermittently applied and relieved in a conduit leading to a bearing from a source of lubricant supply, a measuring device in said conduit comprising spaced valve seats, reciprocable valves cooperating with said seats, means for positively spacing said valves, said valves permitting the passage of lubricant under pressure when unseated and stopping passage of lubricant thereby when seated, means for regulating the distance said valves reciprocate, the quantity of lubricant passing said measuring device on each feeding operating being determined by the distance of the valve reciprocation, and resilient means for exerting a predetermined pressure against said valves opposed to the pressure exerted thereagainst by the pressure of the lubricant.

16. In a lubricating system in which pressure is intermittently applied and relieved in a conduit leading to a bearing from a source of lubricant supply, a measuring device in said conduit comprising spaced valve seats, reciprocable valves cooperating with said seats, means for positively spacing said valves, said valves permitting the passage of lubricant under pressure when unseated and stopping passage of lubricant thereby when seated, means for regulating the distance said valves reciprocate, the quantity of lubricant delivered to the bearing on each feeding operation being determined by the distance of the valve reciprocation, and resilient means for exerting a predetermined pressure against said valves opposed to the pressure exerted thereagainst by the pressure of the lubricant.

17. In a lubricating system in which pressure is intermittently applied and relieved in a conduit leading to a bearing from a source of lubricant supply, a measuring device in said conduit comprising spaced valve seats, reciprocable valves cooperating with said seats, means for positively spacing said valves, said valves permitting the passage of lubricant under pressure when unseated, means for regulating the distance said valves reciprocate, the quantity of lubricant passing said measuring device on each feeding operation being determined by the distance of the valve reciprocation, and resilient means for exerting a predetermined pressure against said valves opposed to the pressure exerted thereagainst by the pressure of the lubricant, said resilient means being adjustable independently of said means adjusting the travel of said valves.

In testimony whereof, I hereunto affix my signature.

GEORGE DOUGLAS JONES.